UNITED STATES PATENT OFFICE.

WILHELM HERZBERG AND WALTER BRUCK, OF SCHÖNEBERG, NEAR BERLIN, GERMANY, ASSIGNORS TO ACTIEN GESELLSCHAFT FÜR ANILIN FABRIKATION, OF BERLIN, GERMANY.

VAT DYES OF THE ANTHRAQUINONE SERIES.

1,008,908.     Specification of Letters Patent.    Patented Nov. 14, 1911.

No Drawing.     Application filed July 26, 1911. Serial No. 640,655.

*To all whom it may concern:*

Be it known that we, WILHELM HERZBERG and WALTER BRUCK, subjects of the Emperor of Germany, residing at Schöneberg, near Berlin, Germany, our post-office addresses being Landshuterstrasse 24 and Neue Culmstrasse 5ᵃ, respectively, Schöneberg, near Berlin, Germany, have invented certain new and useful Improvements in Vat Dyes of the Anthraquinone Series, of which the following is a specification.

Our invention relates to the manufacture of new vat dyes of the anthraquinone series derived from a so-called anthraquinone-acridone and possessing an acidylamino group in the benzene nucleus. These new dyes produce on cotton from a vat containing a hydrosulfite and an alkali, generally speaking, violet tints, which on subsequent treatment with a hot soap solution change to blue tints of an excellent fastness. These new dyes may be manufactured by nitrating an anthraquinone-acridone, reducing the nitro compound thus obtained, and finally substituting in the amino group the residue of an organic acid for a hydrogen atom. Another way consists in acting with an anthraquinonehalogen-acridone upon the amid of an organic acid.

The following examples, the parts being by weight, illustrate the invention, without, however, limiting it:

Example 1: To the solution of 48 parts of anthraquinone-acridone (U. S. Patent No. 961,047) in 240 parts of concentrated sulfuric acid a mixture of 15 parts of nitric acid 63% and 30 parts of concentrated sulfuric acid is slowly added at a temperature of 0–5° C. The mass is poured on ice-water, whereupon the anthraquinonenitroacridone separates in orange-yellow flakes, which melt above 300° C. The nitro compound is filtered off, washed with water, then in aqueous suspension while stirring after addition of a solution of 60 parts crystallized sodium sulfid heated at 90 to 100° C. Thus the blue-colored aminoacridone is formed. It is nearly insoluble in the usual solvents, but it dissolves a little in nitrobenzene and also in anilin with a blue color; it melts above 300° C. From its violet vat cotton is dyed feeble greenish-gray, changing to deep brown by treating with chlorid of lime. 34 parts of the anthraquinone-aminoacridone and 340 parts of nitrobenzene are boiled. By slowly adding 14 parts of benzoyl-chlorid the blue color of the dissolved amino compound immediately turns to reddish-violet and the anthraquinone-benzoyl-amino-acridone separates in crystalline shape. It is insoluble in the usual solvents, in nitrobenzene it dissolves only sparely. The solution in concentrated sulfuric acid is yellowish-red. With hydrosulfite and an alkali a violet vat is formed, from which cotton is dyed violet tints, which on subsequent treatment with a hot soap solution change to blue.

Example 2: 40 parts of anthraquinone-brom-acridone, 12 parts of benzamid, 1 part of copper powder, 6 parts of calcined sodium carbonate and 400 parts of nitrobenzene are boiled in a reflux-apparatus for 24 hours, whereby the solution changes its coloration from red to violet. The product formed during the reaction separates in a dark violet crystalline shape. After cooling the anthraquinone-benzoylamino-acridone is filtered and washed with benzene and then with hot water. It is identical with that, obtained by the process, indicated in the foregoing example.

For acidylizing the amino group of the anthraquinone-amino-acridone other acidylizing agents, such as acetic anhydrid, formic acid, acetyl-chlorid, toluyl-chlorid, chlorbenzoylbromid, phthalic anhydrid may be used, whereas the benzamid employed in the Example 2 may be replaced by one of its substitution derivatives, or by an amid of other organic acids, such as acetic, oxalic, phthalic acids. Instead of an anthraquinone-brom-acridone a chlor-acridone may serve as parent material.

Having now described our invention and in what manner it may be performed what we claim is,—

1. As new articles of manufacture the herein-described new vat dyes of the anthraquinone series being anthraquinone-acidyl-amino-acridones:

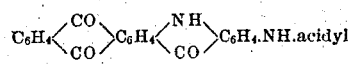

which are insoluble in the usual solvents, very sparely soluble in nitrobenzene, but soluble in concentrated sulfuric acid to a yellowish-red solution and soluble in alkaline hydrosulfite yielding violet vats which dye cotton, generally speaking, violet shades, which change to blue on subsequent treatment with a hot soap solution.

2. As a new article of manufacture the herein-described new vat dye of the anthraquinone series being anthraquinone-benzoyl-amino-acridone:

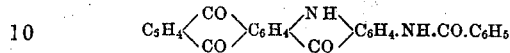

which is a dark bluish-violet powder, insoluble in the usual solvents, very sparely soluble in nitrobenzene, but soluble in concentrated sulfuric acid to a yellowish-red solution and soluble in alkaline hydrosulfite yielding a violet vat which dyes cotton violet shades, which change to blue on subsequent treatment with a hot soap solution.

In testimony whereof we have hereunto set our hands in presence of two subscribing witnesses.

WILHELM HERZBERG.
WALTER BRUCK.

Witnesses:
 WOLDEMAR HAUPT,
 HENRY HASPER.